US011194593B2

(12) United States Patent
Männer (10) Patent No.: US 11,194,593 B2
(45) Date of Patent: Dec. 7, 2021

(54) METHOD FOR OPERATING A PRODUCTION MACHINE OR MACHINE TOOL AND PRODUCTION MACHINE OR MACHINE TOOL AND COMPUTER PROGRAM FOR OPERATING A PRODUCTION MACHINE OR MACHINE TOOL

(71) Applicant: SIEMENS AKTIENGESELLSCHAFT, Munich (DE)

(72) Inventor: Andres Männer, Claussnitz OT Diethensdorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 97 days.

(21) Appl. No.: 16/675,968

(22) Filed: Nov. 6, 2019

(65) Prior Publication Data
US 2020/0142377 A1 May 7, 2020

(30) Foreign Application Priority Data
Nov. 7, 2018 (EP) .................................... 18204946

(51) Int. Cl.
*G05B 19/42* (2006.01)
*G06F 9/445* (2018.01)
(Continued)

(52) U.S. Cl.
CPC ..... *G06F 9/44505* (2013.01); *G05B 19/0426* (2013.01); *G06F 8/63* (2013.01);
(Continued)

(58) Field of Classification Search
CPC . G06F 8/63; G06F 21/51; G06F 9/455; G06F 21/554; G06F 21/50;
(Continued)

(56) References Cited

U.S. PATENT DOCUMENTS

2011/0016414 A1* 1/2011 Ernst .................... G06F 8/63
715/764
2016/0099963 A1* 4/2016 Mahaffey .............. G06F 21/554
726/25
(Continued)

FOREIGN PATENT DOCUMENTS

EP 3 376 392 A1 9/2018

*Primary Examiner* — Tuan A Vu
(74) *Attorney, Agent, or Firm* — Henry M. Feiereisen LLC (57) ABSTRACT

In a method for operating a production machine or machine tool, an app having at least one virtual container and an app configuration is downloaded from a remote memory store into a memory store of the machine, and an immediate start of the downloaded app on the production machine or machine tool is automatically prevented. The app configuration of the downloaded app is then automatically modified, and identifiers included in the app configuration are automatically evaluated and compared with identifiers included in a positive list or in a positive list and a negative list. An identifier which is not contained in the positive list, or an identifier which is contained in neither the positive list nor in the negative list is automatically replaced with an automatically selected or automatically generated target expression; and the downloaded app following the modification of the app configuration is then automatically started.

9 Claims, 5 Drawing Sheets

(51) Int. Cl.
   *G05B 19/042* (2006.01)
   *G06F 21/51* (2013.01)
   *G06F 8/61* (2018.01)
   *G06F 9/455* (2018.01)
   *H04M 1/7246* (2021.01)
   *H04L 29/06* (2006.01)

(52) U.S. Cl.
   CPC .............. *G06F 9/455* (2013.01); *G06F 21/51* (2013.01); *G05B 2219/23146* (2013.01); *G05B 2219/23304* (2013.01); *H04L 63/0876* (2013.01); *H04M 1/7246* (2021.01)

(58) Field of Classification Search
   CPC .............. G06F 9/44505; H04M 1/7246; H04L 63/0876; G05B 19/0426; G05B 2219/23146; G05B 2219/23304
   See application file for complete search history.

(56) References Cited

U.S. PATENT DOCUMENTS

| | | | |
|---|---|---|---|
| 2016/0132214 A1* | 5/2016 | Koushik | G06F 9/455 715/741 |
| 2016/0321452 A1* | 11/2016 | Richardson | G06F 21/50 |
| 2017/0060574 A1 | 3/2017 | Malladi et al. | |
| 2017/0257361 A1* | 9/2017 | Niemela | G06F 21/51 |
| 2018/0288208 A1* | 10/2018 | Lee | H04M 1/7246 |
| 2018/0359244 A1* | 12/2018 | Cockerill | H04L 63/0876 |

* cited by examiner

METHOD FOR OPERATING A PRODUCTION MACHINE OR MACHINE TOOL AND PRODUCTION MACHINE OR MACHINE TOOL AND COMPUTER PROGRAM FOR OPERATING A PRODUCTION MACHINE OR MACHINE TOOL

CROSS-REFERENCES TO RELATED APPLICATIONS

This application claims the priority of European Patent Application, Serial No. 18204946.0, filed Nov. 7, 2018, pursuant to 35 U.S.C. 119(a)-(d), the content of which is incorporated herein by reference in its entirety as if fully set forth herein.

BACKGROUND OF THE INVENTION

The present invention relates to a method for operating a production machine or machine tool, in particular a method for loading additional functions onto a production machine or machine tool. The invention further relates to a production machine or machine tool intended and configured to carry out the method.

The following discussion of related art is provided to assist the reader in understanding the advantages of the invention, and is not to be construed as an admission that this related art is prior art to this invention.

Production machines and machine tools, which will hereinafter also simply referred to as machines, are known and include, in the case of a machine tool, for example, one or more drives (feed drives) for positioning a tool. Such machines are, in each case, a complex combination of different logical and physical components (drives, axes, etc.) in a diverse multiplicity of forms.

In the context of Industry 4.0 and the so-called Internet of Things (IoT), a possibility exists for extending a specific function of such a machine with further functions or microservices by means of so-called apps. Such apps are available in the so-called Cloud for downloading and are provided there for this purpose by a Cloud platform (app store). The downloading of an app from a Cloud platform and the installation of the downloaded app on a target system (host system), in this case a production machine or machine tool, is referred to as deployment.

An app can be offered in an app store for generic machines. Thereby, a respective special construction of a later host system and a runtime environment of the host system are not known and this knowledge is also not required. For this purpose, the app comprises at least one virtual container (hereinafter referred to simply as container) used in so-called container virtualization and a software functionality belonging to the app is embedded in the container or each container included by the app. The container or each container comprises at least one runtime environment necessary for executing the respective embedded software functionality. The runtime environment included by the container enables the execution of the respective software functionality independently of the host system and its runtime environment. An app loaded on a host system is started on the host system by the starting of the container or each container included thereby and is restricted to the virtual container or each virtual container included by the app. Such containers are per se known and thus reference can be made, for example, to the software known under the name "Docker" for so-called container virtualization. Another example is "LXC" (Linux containers).

For data exchange between a downloaded app and the host system, i.e. the respective production machine or machine tool, or for data exchange between downloaded apps with different virtual containers, each container comprises an interface configuration as a constituent of a container configuration. This comprises a definition of real and/or virtual network interfaces, defines the scope of an access authorization to resources and services of the operating system of the host system and/or defines limitations for access to the aforementioned network interfaces, resources or services.

The interface configuration relates not only to available objects. Non-available objects, for example, virtual network interfaces, can also be generated dynamically on starting of an app. The interface configuration then comprises the data for the previously non-available object, for example a virtual network interface, and this is set up after this data.

Especially in the context of the Internet of Things and Industry 4.0, it is particularly relevant that apps do not influence one another either intentionally or unintentionally, since this can result in production losses. With conventional containerization methods, this is not sufficiently assured.

It would therefore be desirable and advantageous to obviate prior art shortcomings and to provide an improved method for operating a machine (production machine or machine tool) of the type mentioned in the introduction in which such mutual influences can be reliably prevented.

SUMMARY OF THE INVENTION

According to one aspect of the present invention, a method for operating a production machine or machine tool includes downloading an app into a memory store of the production machine; preventing the immediate starting of the downloaded app; modifying a configuration of the downloaded app (app configuration); and starting the downloaded app after the modification of the app configuration.

In a first step of the method, initially an app with which the function of the respective machine is to be supplemented or extended is loaded from a remote memory store into a memory store of the machine. The remote memory store is, for example, a memory store belonging to a Cloud platform, for example a memory store established there for the downloading apps (app store). An app downloaded in the context of the method comprises, in a manner that is per se fundamentally known, at least one virtual container with a software functionality encapsulated therein which determines the function of the app. Such an app further comprises configuration data which is grouped together hereinafter under the designation "app configuration".

In a second step of the method, the immediate starting of the downloaded app on the machine is automatically prevented by the machine. This is necessary due to the risk outlined in the introduction that downloaded apps can influence one another. An app, the starting of which is prevented, cannot influence any other apps.

In a third step of the method, an automatic modification of the app configuration is performed by the machine. Herein, assignments included by the app configuration are evaluated. An assignment has, for example, the format: "Device1: DeviceA". A name used within the downloaded app (here: "Device1") is thereby mapped to another name (here: "DeviceA"). This applies generally for any devices, resources and suchlike, that is, for example, also for (virtual or real) networks. This mapping permits the use of a name for a device, a resource or suchlike within the app or the container although the name of the device, the resource, etc. is not yet known on a later host system (of the machine onto which the app is downloaded). An assignment has—in principle, like an equation—a left-hand part and a right-hand part. The right-hand part of the assignment or, in general, the part of the assignment that is not used in the app or the container, is named here and hereinafter the identifier. In the automatic modification of the app configuration, the identifiers included by the app configuration are evaluated. In the evaluation, the identifier or each identifier is compared with identifiers from a positive list or a positive list and a negative list. A negative list is optional. The comparison thus takes place at least in relation to the positive list and, in the event of a negative list existing, in relation to the positive list and the negative list. As an automatic modification of the app configuration, an identifier not contained in the positive list or—in the event of a negative list being available—an identifier contained neither in the positive list nor in the negative list is replaced with an automatically selected or automatically generated unambiguous and unique target expression. If, in the aforementioned example, the identifier "DeviceA" is contained neither in the positive list nor in the negative list, it is replaced with an automatically generated target expression, for example "ABCD1234". A dynamically generated resource is then assigned to this name. It is thereby ensured that resources (for example, interfaces) of apps are unambiguous at run time and cannot be used by other apps.

Following the automatic modification of the app configuration, the downloaded app is automatically started by the machine. Conflicts with other apps, for example an app which also uses the resource "DeviceA", are now precluded.

By means of the automatic modification of the app configuration, the namespace of the downloaded app is amended. The namespace comprises, for example, designations of a (virtual or real) network which uses the app. However, the namespace also comprises, for example, designations of further devices, resources and suchlike which the app uses. Immediately after the downloading of an app, its namespace can have undesirable overlaps with the namespace of another app, for example because both apps access the same networks, devices, resources, etc. by reason of having the same identifier. The main advantage proposed herein is that the automatic modification creates an adapted namespace for the newly downloaded app which prevents such undesirable overlaps.

The advantage proposed herein comes into consideration for machine tools and, in general, for axis-based machines. As is known, all machines that serve, inter alia, in engineering and in toolmaking for machining components (workpieces) with tools and have a plurality of machine axes for moving the respective tool, are given the designation machine tool. Included among the machine tools are so-called NC or CNC machines. An industrial robot is, as known, a universal, programmable machine with a plurality of machine axes, which is intended and configured, apart from for machining components, alternatively also for handling workpieces and for assembly purposes. An industrial robot is an example of a general processing machine, herein designated a production machine. A machine tool is an example of a special processing machine. For the purpose of covering all the possibilities of axis-based machines intended and configured for the machining and processing of components, their handling and transport or, for example, for precise placement in relation to at least one further component, here and hereinafter, reference will be made to production machines or machine tools and sometimes, for short, to machines.

According to another advantageous feature of the present invention, an identifier contained in the positive list or an identifier contained either in the positive list or in the negative list can be replaced with a target expression allocated to the identifier. Thereby, permitted identifiers (which are found in the positive list) and, where relevant, also non-permitted identifiers (which, in the case of a negative list being present, are found therein) are automatically replaceable with a respective target expression and are replaced automatically in the context of the method. The allocated target expression is either coded directly in the positive or negative list or is coded in a conversion table. By means of the replacement of identifiers used in the app configuration and contained in the positive list, the usability of resources and devices by the downloaded app on special devices and resources is restricted, specifically to such devices and resources that are placed in the positive list or the conversion table as target expressions.

According to another advantageous feature of the present invention, the automatic prevention of the immediate starting of an app, the automatic modification of the app configuration and the subsequent automatic starting of the app can be carried out, in each case, by the machine by means of one and the same software functionality of the machine (production machine or machine tool), specifically a software functionality that is designated below as an administration unit. The administration unit is a computer program, a computer program module, where relevant also a distributed computer program or computer program module, which is loaded into the memory store of the production machine or machine tool and is executed when the method is carried out by a processing unit of the production machine or machine tool. This has the advantage of a concentration of the central steps of the approach proposed here to exactly one unit, specifically the administration unit, which can then also function, for example, as a runtime environment for the or each downloaded app.

According to another advantageous feature of the present invention, the administration unit can function as an interface between the downloaded app and the production machine or machine tool in that the administration unit makes available defined interfaces for the downloaded app. The administration unit then functions as a safety layer for the machine onto which the app has been downloaded and by means of the defined interfaces ensures only access to uncritical devices and resources of the machine and/or only access in an uncritical extent, whereby uncritical means, in each case, that the function of the machine is not called into doubt.

According to another aspect of the invention, a production machine or machine tool is configured for carrying out the aforedescribed method. The machine includes a memory store for apps downloaded from a remote memory store. Loaded into the memory store is a computer program incorporated in the administration unit for carrying out the aforedescribed method (computer program or computer program module, possibly in a distributed form).

The production machine or machine tool proposed herein can also be constructed to include a memory store for apps that can be downloaded from a remote memory store and an administration unit loaded into the memory store and implemented in software, wherein the administration unit is intended and configured to automatically carry out at least the following method steps: preventing an immediate starting of a downloaded app on the production machine or machine tool, modifying an app configuration of a downloaded app and starting a downloaded app following the modification of the app configuration. The administration unit modifies an app configuration of a downloaded app in that identifiers included by the app configuration are evaluated and compared with identifiers included by a positive list or by a positive list and a negative list and an identifier not contained in the positive list or—in the event of a negative list being available—an identifier contained neither in the positive list nor in the negative list is replaced with an automatically selected or automatically generated target expression.

According to another advantageous feature of the present invention, the administration unit can make available defined interfaces for the downloaded app and functions as an interface (software interface) between the downloaded app and the production machine or machine tool.

According to another advantageous feature of the present invention, the production machine or machine tool can include a so-called edge device and the downloading of apps takes place into a memory store of the edge device and the administration unit is carried out on the edge device so that the apps and the administration unit are concentrated in a separate unit.

Apps which come into consideration as apps downloaded onto a production machine or machine tool are preferably such apps which function in one embodiment on the production machine or machine tool as IoT extensions of the production machine or machine tool. To this extent, the novelty proposed herein is also the use of a method as described here and hereinafter for the installation of IoT extensions on a production machine or machine tool.

According to yet another aspect of the invention, a computer program with program code, i.e. a computer program including computer program commands, wherein on an execution of the computer program by or on a production machine or machine tool, the program code or computer program commands cause it to carry out the steps of the described method. Where method steps or sequences of method steps are described below, this relates to actions which take place as a result of the computer program or under the control of the computer program. At least each use of the expression "automatic" indicates that the relevant action takes place as a result of the computer program or under the control of the computer program.

According to still another aspect of the present invention, a non-transitory computer-readable storage medium includes electronically readable control signals which, on execution by a production machine or machine tool cause it to carry out the steps of the aforedescribed method, i.e. a computer-readable storage medium or, in general, a computer program product on which a computer program is stored as a means for carrying out the method described here and hereinafter, in particular a computer program functioning in the method as an administration unit.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The exemplary embodiments described below are not to be understood as a limitation of the invention. Rather, in the context of the present disclosure, enhancements and modifications are also possible, in particular those which for a person skilled in the art are derivable with regard to the solving of the problem, for example by combination or modification of individual features or method steps in conjunction with those described in the general or special description part and in the claims and/or the drawing and, by means of combinable features, lead to a new subject matter or new method steps or method step sequences.

Figure 1:
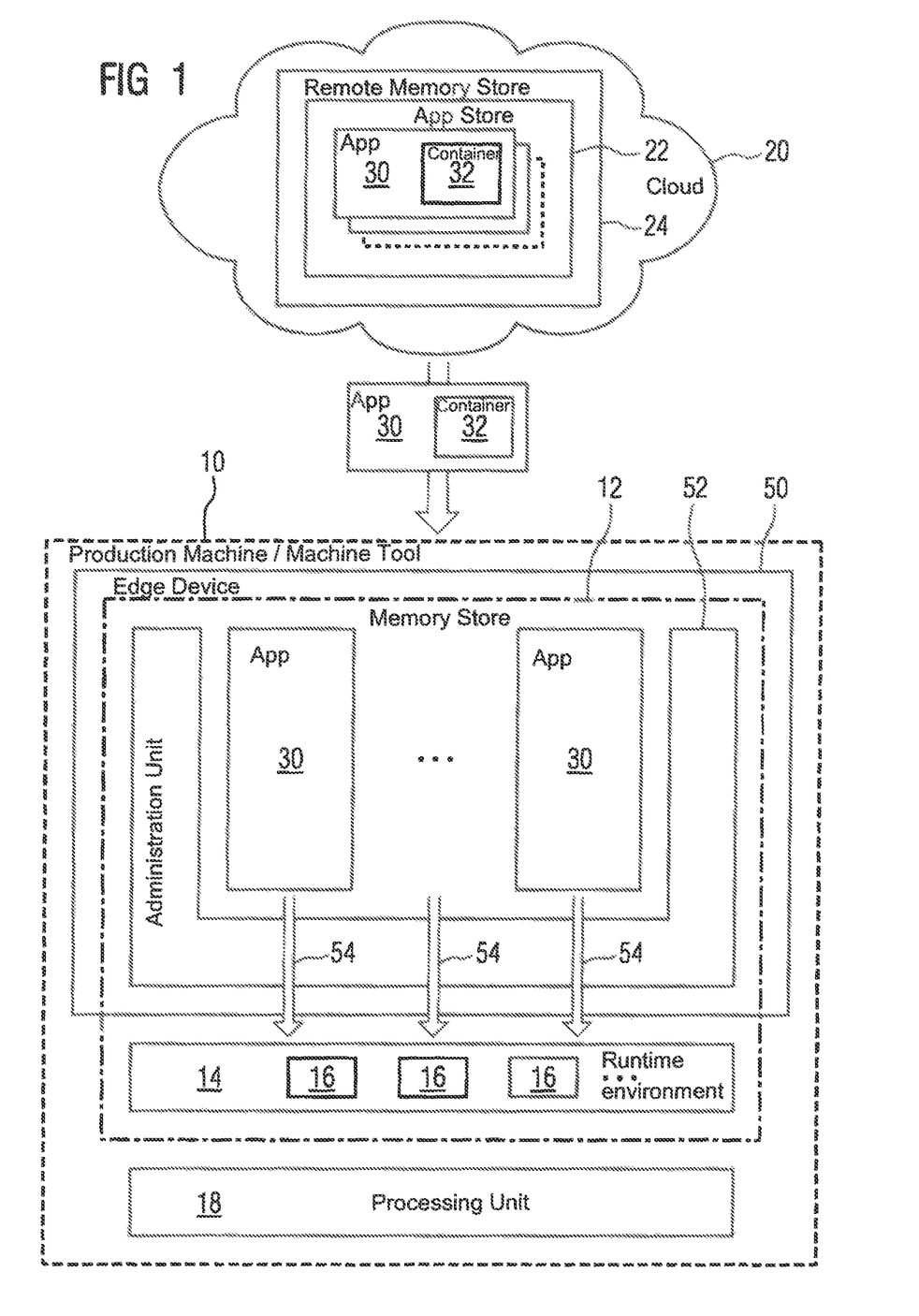
FIG. 1 shows a production machine or machine tool with apps downloaded from an app store into a memory store of the production machine or machine tool.

Turning now to the drawing, and in particular to FIG. 1, there is shown in a schematically highly simplified form a production machine or machine tool 10 of the aforementioned type hereinafter often merely designated machine 10 for short. Mechanical details of the machine 10, i.e. for example axes or suchlike, are not shown. Rather, the representation is restricted essentially to a representation of a memory store 12 included by the machine 10, specifically a memory store 12 for storing data.

A so-called runtime environment 14 (or runtime, for short) of the machine 10 is loaded into the memory store 12 in a manner that is, in principle, per se known. This determines the basic functionality of the machine 10 and depends on its configuration. In a machine 10 in the form of a machine tool with exactly two advance axes, the runtime environment 14 comprises, for example, at least modules or function units 16 implementable in software for controlling these axes, for example for position-regulated, speed-regulated and/or acceleration-regulated axis control.

In order to carry out the runtime environment 14 and the software function units 16 included thereby, the machine 10 comprises at least one processing unit 18 in the form or the manner of a microprocessor.

The functionality of the runtime environment 14 is fixed at the time of delivery of the respective machine 10. In principle, the functionality of the runtime environment 14 can be amended or extended with an update or upgrade of the runtime environment 14. With the novelty proposed here, a substantially increased flexibility on amending or enhancing the function of the respective machine 10 is provided.

In the so-called Cloud 20, a so-called app store 22 of a Cloud platform is reachable in a manner that is, in principle, per se known. The app store 22 is, in principle, in a per se known manner, a computer program which is loaded into a memory store 24 of a computer or computer system reachable in the Cloud 20, possibly also in a distributed memory store 24 of a distributed computer system. In this memory store 24 or generally in a memory store 24 that is remote in relation to the machine 10, at least one so-called app 30, i.e. a computer program, is ready for downloading. Herein, downloading means a data transfer from the Cloud 20 and the app store 22 there (or in general, from the remote memory store 24) into the memory store 12 of the machine 10.

Figure 2:
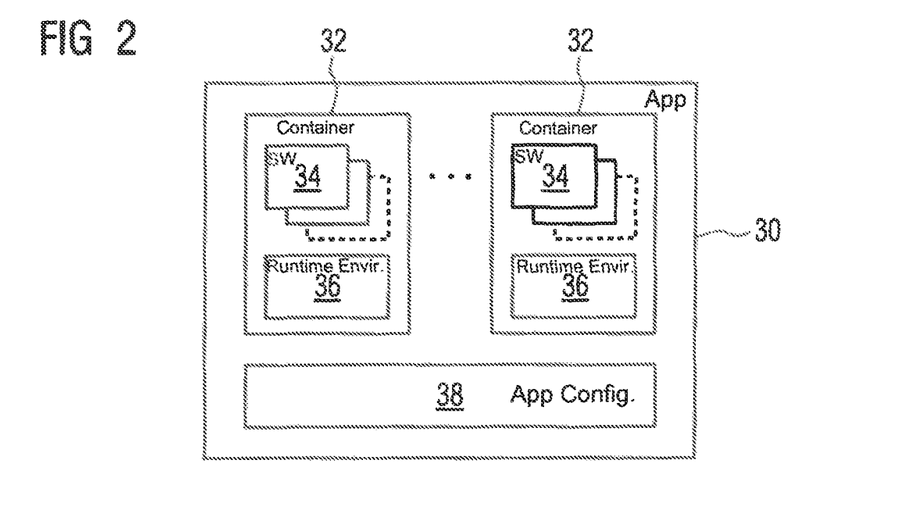
FIG. 2 shows a representation of details of an app downloaded from an app store.

The representation in FIG. 2 shows, in a schematically simplified form, a single app 30. So that an app 30 available in the app store 22 can be executed, in principle, on any machine 10, the app 30 comprises at least one so-called virtual container 32 or a plurality of virtual containers 32. Such a container 32 is the basic object of the so-called container virtualization. The concept of the container virtualization and the use of virtual containers are per se known. Further explanations regarding container virtualization and virtual containers are therefore not required here and reference is made to the corresponding specialist literature.

A container 32 comprises, in principle, in a per se known manner, at least one software functionality 34 (FIG. 2) belonging to the app 30 and a runtime environment (container runtime environment 36; FIG. 2) for the software functionality 4 included by the container 32. The software functionality 34 or the totality of the software functionalities 34 included by the app 30 in a container 32 or a plurality of containers 32 determines the functionality of the app 30. The app 30 includes a configuration (app configuration 38) which comprises configuration information (container interface) for at least one or the container or each container 32 belonging to the app 30. A container interface maps the names of devices, resources and suchlike used within the container 32 to a name for the respective device, the respective resource, etc. usable outside the container 32. Thereby, for example, for access to a (virtual or real) network within the container 32, a name for this network can be used without it already being known how the network is named on a host system, that is for example a machine 10 onto which the app 30 comprising this container is downloaded. The container interface ensures, in a manner that is, in principle, per se known, the decoupling of the container 32 from the devices, resources and suchlike of a host system that is firstly unknown and secondly completely arbitrary at the time point of the development of the container 32. The app configuration 38 belonging to a downloaded app 30 is the totality of all the container interfaces of the containers 32 included by the app 30.

The app configuration 38 and its configuration information is or are automatically evaluated and possibly modified according to the approach proposed here.

Figure 3:
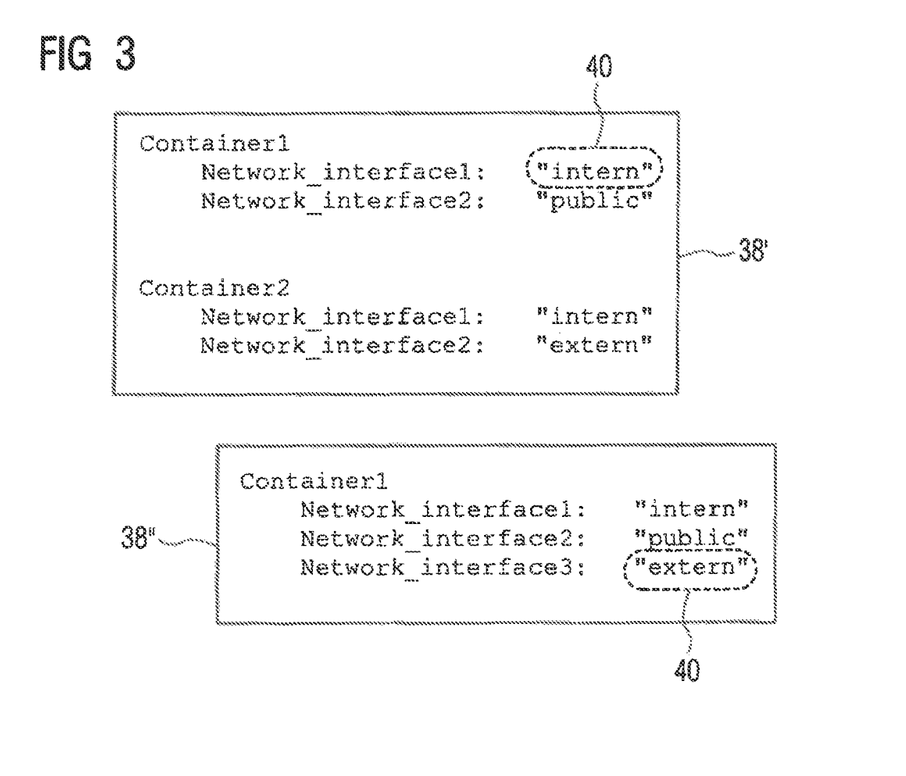
FIG. 3 shows examples of a configuration (app configuration) of an app that can be downloaded from an app store.

The representation in FIG. 3 shows, as an example of an app configuration 38, a first simple app configuration 38' and a second simple app configuration 38". Each app configuration 38 relates to a separate app 30. In the example shown, the first app configuration 38' relates to an app 30 with at least two containers 32, specifically the containers designated in the configuration 38' by way of example as "container1" and "container2". The second app configuration 38" relates to an app 30 with one container 32 or a plurality of containers 32, specifically at least with the container 32 designated in the configuration 38" by way of example as "container1". It should be noted that the two containers 32 designated "container1" are containers 32 of different apps 30. Despite having the same name, the containers 32 are therefore not identical.

The first app configuration 38' implies that the container 32 with the designation "container1" contained by the app 30 to which the app configuration 38' belongs uses a plurality of networks and for access to these uses continuously numbered network interfaces which are unambiguously identified with a symbolic identifier 40 (in this case: "intern" and "public") within the app 30. The container 32 with the designation "container2" included by the same app 30 also uses a plurality of networks with unambiguous symbolic identifiers 40 (in this case: "intern" and "extern"). The same identifier 40 (in this case: "intern") for both containers 32 included by the app 30 means that the containers 32 (the containers 32 with the designations "container1" and "container2") are communicatively connected via the network (a virtual network or a real network) to which is allocated the identifier 40 "intern".

The second app configuration 38" implies that the container 32 with the designation "container1" contained by the app 30 to which the app configuration 38" belongs uses a plurality of networks identified by the symbolic identifier 40 (in this case: "intern", "public" and "extern").

The identifiers 40 ("intern", "extern" and "public") used in the representation are merely examples and other identifiers 40 are equally conceivable in place of such identifiers 40.

Figure 4:
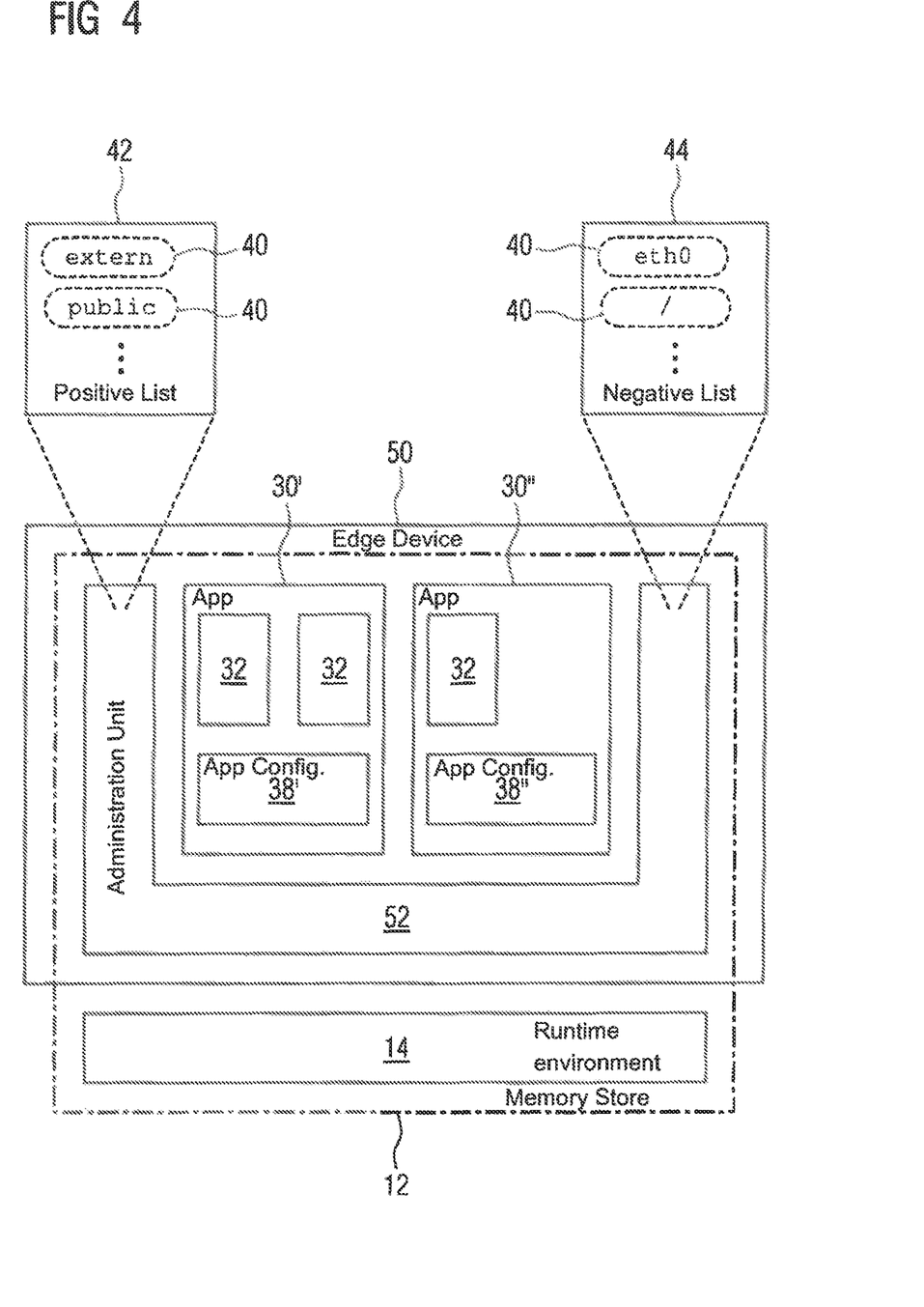
FIG. 4 shows details of a platform for receiving loaded apps and an administration unit for carrying out the approach proposed here.

It is essential, however, that at least individual identifiers 40 usable in the context of an app configuration 38, 38', 38" are defined or definable. Such defined or definable identifiers 40 are the basis for a positive list (white list) 42 (FIG. 4) and a fundamentally optional negative list (black list) 44 (FIG. 4). These lists 42, 44 or a corresponding data set are automatically evaluated on downloading an app 30 (deployment) onto a machine 10.

In the representation in FIG. 1, the downloading of an app 30 onto a machine 10 is shown by means of an arrow pointing from the Cloud 20 and the app store 22 to the machine 10. The arrow can also be shown as pointing from the remote memory store 24 to the memory store 12 of the machine 10 and the downloading of an app 30 to a machine 10 is also the downloading of the app 30 from a remote memory store 24 into the memory store 12 of the machine 10.

The representation in FIG. 4 shows the machine 10 with downloaded apps 30', 30" with further details. The downloading of an app 30', 30" takes place into the memory store 12 of the machine 10 and preferably into a memory store of a so-called edge device 50 (FIG. 1, FIG. 4). The automatic evaluation and possible modification of the associated app configuration 38', 38" takes place by means of an app interface and app administration unit implemented as a computer program or as a computer program module (possibly as a distributed computer program, computer program module). This app interface and app administration unit is designated here and hereinafter, for short, as the administration unit 52. The administration unit 52 is loaded into the memory store 12 of the machine 10 and is preferably also loaded into the memory of the edge device 50.

The edge device 50 is included by the machine 10 or is connected to the machine at least communicatively. The edge device 50 therefore belongs to the machine 10. Thus with an administration unit 52 loaded into the memory store of the edge device 50, said administration unit is also loaded into the memory store 12 belonging as a whole to the machine 10. In the schematically extremely simplified representation in FIG. 1 and FIG. 4, the edge device 50 is represented as a block within the machine 10 which is itself shown simply as a block. The memory store 12 of the machine 10 extends in the representations in FIG. 1 and FIG. 4 as far as into the edge device 50. This is intended to illustrate that the memory store of the edge device 50 belongs to the address space of the machine 10 and thus overall to the memory store 12 of the machine 10. The edge device 50 can have, in a per se known manner, its own processing unit (not shown) in the form or in the manner of a microprocessor.

The downloading of an app 30', 30" takes place by means of the downloading of the app 30', 30" together with the or each of the containers 32 included by the app 30', 30" and the app configuration 38', 38" included by the app 30', 30". By means of the downloading of an app 30', 30", the functional scope of the machine 10 can be extended. The basic functionality of the machine 10 remains unaffected thereby.

The automatic evaluation of the app configuration 38', 38" during deployment takes place by means of the administration unit 52 implemented in software. The administration unit 52 makes defined interfaces 54 available for downloaded apps 30, 30', 30". Such interfaces 54 are shown schematically simplified in the representation in FIG. 1 as "channels" through the administration unit 52. Access to the runtime environment 14 of the machine 10 and associated devices and resources included by the machine 10 or belonging to the machine 10 is only possible via the administration unit 52 and the interfaces 54 defined there. The administration unit 52 therefore functions as an interface to the machine 10 and as a security layer between a downloaded app 30, 30', 30" and the machine 10. Only the administration unit 52 starts a downloaded app 30, 30', 30" and the container or each container 32 included thereby. If downloaded apps 30, 30', 30" are each intended for carrying out at least one IoT function, the administration unit 52 enables the enhancement of the functionality of the machine 10 by IoT functions and the administration unit 52 functions as a platform for machine-specific IoT extensions.

One function of the administration unit 52 is that it automatically prevents immediate starting of a downloaded app 30, 30', 30" and the containers 32 included thereby. A starting of the app 30', 30" and containers 32 included thereby only takes place under the control of the administration unit 52 and only once it has checked the app configuration 38', 38" of the app 30', 30" and—if necessary—modified it. A further function of the administration unit 52 lies correspondingly therein that it automatically checks and possibly modifies an app configuration 38', 38" of a downloaded app 30', 30". A further function of the administration unit 52 lies therein that it automatically starts a downloaded app 30', 30" (by starting the or each respective container 32 comprised thereby), provided the automatic checking and modification of the respective app configuration 38', 38" have been carried out successfully.

The automatic checking and modification of an app configuration 38', 38" of a downloaded app 30', 30" by means of the administration unit 52 are based on the two already mentioned lists 42, 44, i.e. the positive and the negative list 42, 44, and the identifiers 40 stored there. The positive and the negative list 42, 44 (the negative list 44 is in principle optional; if the lists 42, 44 are named together, the optionality of the negative list 44 is always to be understood) and the identifier(s) 40 included thereby is or are to be found on the basis of the interfaces 54 for downloaded apps 30, 30', 30" made available by the administration unit 52, specifically interfaces 54 to the machine 10 and its runtime environment 14. The positive list 42 or the positive list 42 and the negative list 44 is or are generated on the basis of the interfaces 54 made available by the administration unit 52, either automatically by the administration unit 52 or through a human user, for example by the person who installs the administration unit 52 on the respective machine 10 and thus possesses knowledge both about the functional scope of the administration unit 52 as well as about the functional scope of the machine 10 and about its runtime environment 14 and over devices and resources therein. The administration unit 52 comprises, or at least has access to, the positive list and the negative list 42, 44.

The automatic checking and modification of an app configuration 38', 38" will now be described using the example of the configurations shown in FIG. 3. The illustrated example assumes that two apps 30 have been downloaded. To distinguish them, these are designated first app 30' and second app 30". For example, firstly, the first app 30' and later the second app 30" is downloaded. However, the sequence of the downloading and the time point of the downloading are not important. The aforementioned sequence on downloading the two apps 30', 30" is assumed here merely by way of example.

Figure 5:
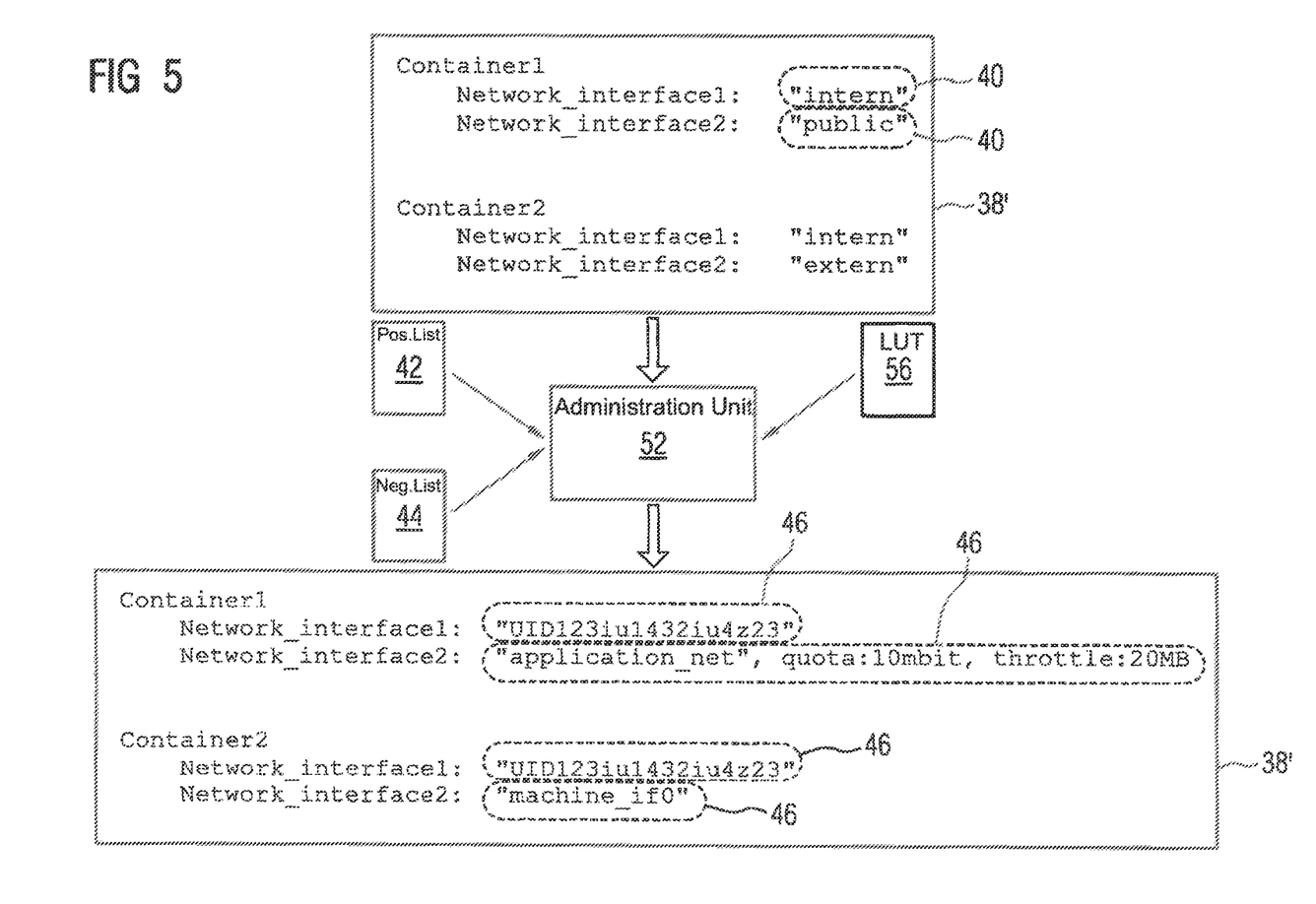
FIGS. 5 and 6 show examples of an app configuration and a (modified) app configuration according to the approach proposed here.

By means of the administration unit 52, the starting of the apps 30', 30" is controlled and monitored automatically. Following the downloading of the first app 30', initially, its starting (the starting of the container or each container 32 comprised thereby) is prevented. Thereafter, by means of the administration unit 52, the app configuration 38' of the first app 30' is automatically evaluated. Thereby, the contents of the positive list 42 and—where present—the contents of the negative list 44 is taken into account and identifiers 40 used in the app configuration 38' are compared with the identifiers 40 in the positive list 42 or the positive list and the negative list 42, 44. The app configuration 38' of the first app 30' comprises, inter alia, the identifier 40 "public". This identifier 40 is present in the positive list 42 (see FIG. 4). On the basis of the positive list 42, it can accordingly already be ascertained automatically that it is a permissible identifier 40. A permissible identifier 40 is converted, for example, by means of a conversion table (lookup table, LUT) 56 into a target expression 46 (FIG. 5). If an identifier 40 used in the app configuration 38' is included in the negative list 44, on the basis thereof, it is automatically (by means of the administration unit 52) ascertainable that it is an inadmissible identifier 40 (for example, "eth0" or "/" for preventing a direct access to the network interface or for preventing a direct access to the so-called root directory. In principle, an inadmissible identifier 40 can also be converted by means of a conversion table, in particular the same conversion table 56, i.e. for example into a permissible identifier. The or each conversion table 56 is also loaded into the memory store 12 of the machine 10 and is preferably also loaded into the memory of the edge device 50 there. The or each conversion table 56 comprises paired related entries, that is in each case, firstly, an identifier 40 and, secondly, a target expression 46 belonging to the identifier 40. The content of the conversion table 56 can also be included by the positive list and the negative list 42, 44 themselves. Then these lists 42, 44 or the respective list 42, 44 not only comprise the respective permitted or not permitted identifiers 40, but for each identifier 40 also the respectively allocated target expression 46.

In the example shown, the identifier 40 "public" determined automatically as permissible by the administration unit 52 by means of the positive list 42 is replaced with the target expression 46 (resulting either due to the conversion table 56 or due to the positive list 42) ""application_net", quota:10 mbit, throttle:20 MB", as shown in the representation in FIG. 5. A target expression 46 is, in principle, freely selectable and the respectively selected formulation is entered in the respective list 42, 44 or the conversion table 56. It is of essential importance that the target expression 46 is a valid expression during the operation of the machine 10. In the present case, the target expression 46 denotes the name of a network (application_net) used by the machine 10. Furthermore, the target expression 46 comprises a specification (quota:10 mbit) which permits the use of this network in the scope of a particular data rate and the specification states that from a particular data volume (throttle:20 MB), a reduction in the data rate occurs. Any desired specifications can be added to a target expression 46, as permitted in a parameterization of a network or a network access.

The app configuration 38' also comprises a further identifier 40 which is contained in the positive list 42 ("extern"). This is also automatically replaced by the administration unit 52 in essentially the same way as described above. The result of this replacement is also shown in the representation in FIG. 5 ("extern" becomes "machine_if0").

However, usually, the app configuration 38' also comprises identifiers 40 which are contained neither in the positive list 42 nor in the negative list 44 (not in the positive list 42 or neither in the positive list 42 nor in the negative list 44). In the simple example shown in the figures (FIGS. 3 and 5), it is the identifier 40 "intern" that is used. This identifier 40 relates to the name of a virtual network (internal virtual network) used by the first app 30'. An identifier 40 which during the automatic checking of an app configuration 38 is not in the positive list 42 or is neither in the positive list 42 nor in the negative list 44 is automatically replaced by the administration unit 52 with a target expression 46 in the form of a system-wide unique label. In the example shown, the target expression 46 is: "UID123iu1432iu4z23".

The system-wide unique label is automatically selected or generated by the administration unit 52. The label is system-wide unique if it does not lead to any conflict on use during operation of the machine 10. The system to which "system-wide unique" refers is thus the entire machine 10 with all the function units comprised thereby.

One possibility for selecting a system-wide unique label lies, for example, therein that successively a label is adopted from a predetermined list with unique labels and the adopted label is then deleted from the list. One possibility for generating a system-wide unique label lies, for example, therein that a label is generated in the manner of a so-called Universally Unique Identifier (UUID). Such or a similar selection or generation takes place automatically by means of the administration unit 52.

The system-wide unique label leads thereto that on a (later/subsequent) start of the app 30' and a start of the container 32 included thereby by the administration unit 52 for the app 30', the internal virtual network awaited thereby is available and can be used. The system-wide unique identifier leads however thereto that other apps 30, 30" which do not know the selected/generated unique label have no access to this virtual network of the app 30'.

This becomes yet clearer if in the example shown in the figures (FIGS. 3 and 6), the app configuration 38" of the second app 30" is also observed. For this app 30" too, its app configuration 38" is tested and modified automatically by the administration unit 52 in the manner described above. Thereby, the identifiers 40 "public" and "extern" are replaced with the same target expressions 46 as was done in the app configuration 38' of the first app 30'. This leads thereto that both apps 30', 30" access the same networks where this is provided ("application_net", "machine_if0").

Figure 6:
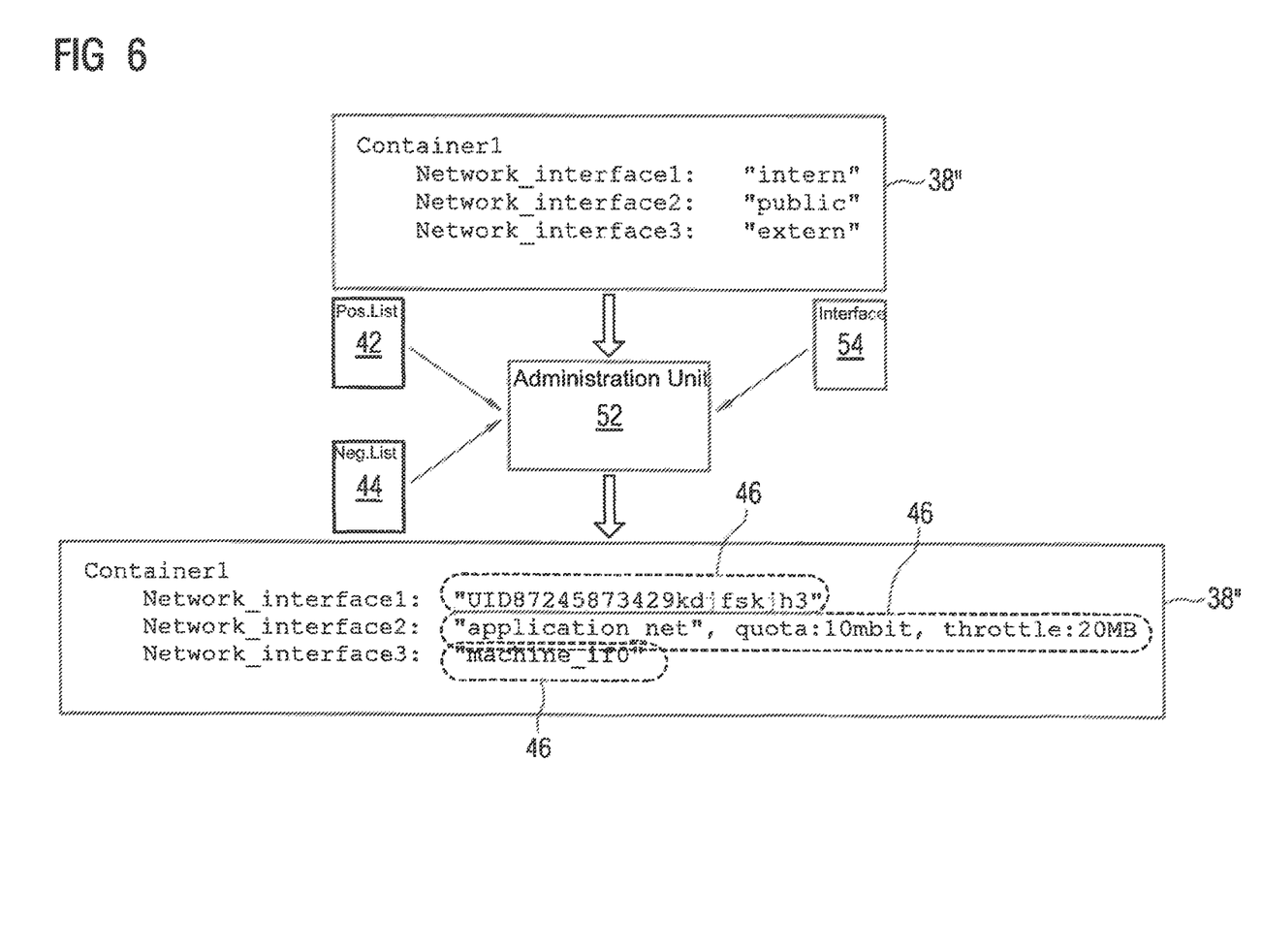

The app configuration 38" of the second app 30" also comprises an identifier 40 which is contained neither in the positive list nor in the negative list 42, 44. The fact that this identifier 40 is the same identifier 40 which is also included in the app configuration 38' of the first app 30' is merely due to the simplicity of the example selected here; in principle, any identifiers 40 are usable. Here also, the or each identifier 40 not in the positive list 42 or neither in the positive list nor in the negative list 42, 44 is automatically replaced by the administration unit 52 with a target expression 46 in the form of a system-wide unique label. In the example shown, the target expression 46 is: "UID87245873449kdjfskjh3".

The label resulting here as the target expression 46 is identified as being different from the unique label resulting during the modification of the app configuration 38' of the first app 30'. The unique label again has the result that on starting, the second app 30" finds an expected virtual network. However, the unique label also has the result that no communicative connection exists between the second app 30" and the first app 30' (since neither of the two apps 30', 30" has information regarding the internal virtual network used by the respective other app 30', 30"). The two apps 30', 30" therefore cannot influence one another and are entirely independent of one another in their implementation.

As a result, therefore, as part of the automatic adaptation of each app configuration 38, 38', 38" before the start of the respective app 30, 30', 30" by means of the administration unit 52, a separate namespace is created for each app 30, 30', 30" downloaded from an app store 22 or, generally, from a remote memory store 24. The separate namespace prevents conflicts between simultaneously executed apps 30, 30', 30" and ensures that downloaded apps 30, 30', 30" cannot influence one another. In that it is ensured that downloaded apps 30, 30', 30" cannot influence one another, a reliable operation at least of the machine 10 itself is assured. Insofar as the administration unit 52 represents a defined interface to the machine 10 and downloaded apps 30 consequently can only use interfaces 54 made available by the administration unit 52 for an access to the machine 10, the machine 10 is accordingly protected against downloaded apps 30 in accordance with the interface definition.

Individual significant aspects of the description set forth here can thus be briefly summarized as follows: what is proposed is a method for operating a machine 10—a production machine or machine tool 10—a machine 10 operating according to the method, a use of the method and a computer program with an implementation of the method, wherein the method comprises the following steps: downloading an app 30 together with an app configuration 38 from a remote memory store 24 into a memory store 12 of the machine 10, preventing an immediate starting of the downloaded app 30, modifying the app configuration 38 of the downloaded app 30, wherein on modification, identifiers 40 included by the app configuration 38 are replaced, case by case, with an automatically selected or automatically generated target expression 46, and starting the downloaded app 30 following the modification of the app configuration 38.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled In the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating a production machine or machine tool, the method comprising, in the following order:
   downloading an app, which comprises at least one virtual container in conjunction with an app configuration, from a remote memory store into a memory store of the production machine or machine tool;
   automatically preventing an immediate starting of the downloaded app on the production machine or machine tool;
   automatically evaluating identifiers included in the app configuration and comparing the identifiers in the app configuration with identifiers included in a positive list or in a positive list and a negative list,
   automatically modifying the app configuration of the downloaded app,
   automatically replacing an identifier which is not contained in the positive list, or an identifier contained neither in the positive list nor in the negative list with an automatically selected or automatically generated target expression in form of a system-wide unique label that is different from the app configuration of all other apps of the production machine or machine tool; and
   automatically starting the downloaded app on the production machine or machine tool after the modification of the app configuration with the system-wide unique label.

2. The method of claim 1, further comprising:
   modifying the app configuration by replacing an identifier contained in the positive list or an identifier contained either in the positive list or in the negative list with the target expression allocated to the identifier, and
   coding the allocation either in the positive list or in the negative list or in a conversion table.

3. The method of claim 1, wherein preventing the immediate starting of the downloaded app, modifying the app configuration and starting the app after the modification of the app configuration is carried out by an administration unit loaded into a memory store of the production machine or machine tool.

4. The method of claim 3, wherein the administration unit provides interfaces for the downloaded app, with the interfaces operatively connected between the administration unit and the production machine or machine tool.

5. A production machine or machine tool, comprising
   a memory store storing an app downloaded from a remote memory store; and
   an administration unit implemented in software and loaded into the memory store, said administration unit being configured to, in the following order:
   automatically prevent an immediate starting of the downloaded app on the production machine or machine tool;
   automatically evaluate identifiers included in the app configuration and comparing the identifiers in the app configuration with identifiers included in a positive list or in a positive list and a negative list,
   automatically modify the app configuration of the downloaded app,
   automatically replace an identifier which is not contained in the positive list, or an identifier contained neither in the positive list nor in the negative list with an automatically selected or automatically generated target expression in form of a system-wide unique label that is different from the app configuration of all other apps of the production machine or machine tool; and
   automatically start the downloaded app on the production machine or machine tool after the modification of the app configuration with, the system-wide unique label.

6. The production machine or machine tool of claim 5, wherein the administration unit provides interfaces for the downloaded app, with the interfaces operatively connected between the administration unit and the production machine or machine too.

7. A method for installing of IoT (Internet of Things) extensions on a production machine or machine tool, said method comprising, in the following order:
   downloading an app, which comprises at least one virtual container in conjunction with an app configuration, from a remote memory store into a memory store of the production machine or machine tool;
   automatically preventing an immediate starting of the downloaded app on the production machine or machine tool;
   automatically evaluating identifiers included in the app configuration and comparing the identifiers in the app configuration with identifiers included in a positive list or in a positive list and a negative list,
   automatically modifying the app configuration of the downloaded app,
   automatically replacing an identifier which is not contained in the positive list, or an identifier contained neither in the positive list nor in the negative list with an automatically selected or automatically generated target expression in form of a system-wide unique label that is different from the app configuration of all other apps of the production machine or machine tool; and
   automatically starting the downloaded app on the production machine or machine tool after the modification of the app configuration with the system-wide unique label.

8. A computer program embodied on a non-transitory computer-readable medium, wherein the computer program comprises program code which, when loaded into a memory store of an administration unit of a production machine or machine tool and executed by a processor of the administration unit, causes the administration unit to, in the following order:
   automatically prevent an immediate starting of an app downloaded from a remote memory store on the production machine or machine tool;
   automatically evaluate identifiers included in the app configuration and comparing the identifiers in the app configuration with identifiers included in a positive list or in a positive list and a negative list,
   automatically modify the app configuration of the downloaded app,
   automatically replace an identifier which is not contained in the positive list, or an identifier contained neither in the positive list nor in the negative list with an automatically selected or automatically generated target expression in form of a system-wide unique label that is different from the app configuration of all other apps of the production machine or machine tool; and automatically start the downloaded app on the production machine or machine tool after the modification of the app configuration with the system-wide unique label.

9. A non-transitory computer-readable storage medium comprising a computer program having program code representing electronically readable control signals, wherein the program code, when loaded into a memory store of an administration unit of a production machine or machine tool and executed by a processor of the administration unit, causes the administration unit to, in the following order:

automatically prevent an immediate starting of an app downloaded from a remote memory store on the production machine or machine tool;

automatically modify the app configuration of the downloaded app, automatically evaluate identifiers included in the app configuration and comparing the identifiers in the app configuration with identifiers included in a positive list or in a positive list and a negative list, automatically replace an identifier which is not contained in the positive list, or an identifier contained neither in the positive list nor in the negative list with an automatically selected or automatically generated target expression in form of a system-wide unique label that is different from the app configuration of ail other apps of the production machine or machine tool; and automatically start the downloaded app on the production machine or machine tool after the modification of the app configuration with the system-wide unique label.

* * * * *